E. LAMM.
Improvement in Supplying Steam to Traveling Engines
No. 5,083. Reissued Oct. 1, 1872.
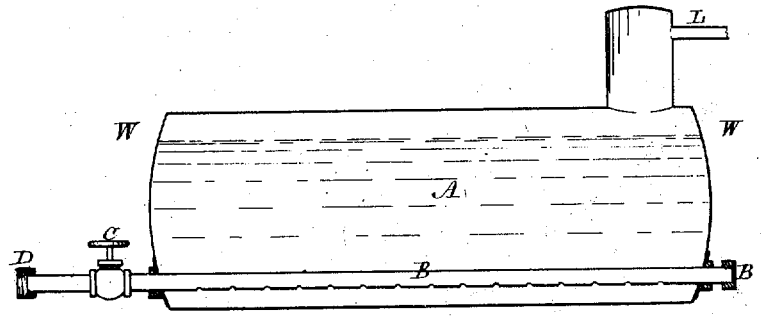
Witnesses.
S. M. Pool.
Edmund Masson.
Inventor.
Emile Lamm.
By atty. A. B. Stoughton.

UNITED STATES PATENT OFFICE.

EMILE LAMM, OF NEW ORLEANS, LOUISIANA.

IMPROVEMENT IN SUPPLYING STEAM TO TRAVELING-ENGINES.

Specification forming part of Letters Patent No. 129,969, dated July 30, 1872; reissue No. 5,083, dated October 1, 1872.

*To all whom it may concern:*

Be it known that I, EMILE LAMM, of the city of New Orleans, parish of Orleans, and State of Louisiana, have invented a new and Improved Mode of Compressing and Carrying Steam in Traveling-Engines, of which the following is a full and exact description, reference being had to the accompanying drawing and the letters of reference thereon.

The object of my invention is to facilitate the supply of means for furnishing steam to a traveling-engine unencumbered with a permanently-attached boiler.

The steam, to accomplish the above-mentioned object, is generated in a stationary steam-boiler situated at the station or car-depot, and, by a temporary connection made between this boiler and a tank carried on the car or truck, many volumes of steam can be, if desired, compressed into one volume in the liquid contents of the tank, thus enabling the car to make a trip of several miles with its complement of passengers on board with one single charge of steam.

By reference to the drawing and the letters of reference thereon my invention will be readily understood.

A is the tank on the car. W W denote the liquid or water line. B represents an iron tube bolted or screwed through the heads of the tank A. This tube is closed at one end, and at its other end is provided with both a throttle-valve, C, and one-half of a grooved flange-coupling, D. The tube B is perforated inside of the tank by a number of small holes, the apertures of which are turned downward. The holes are placed about four inches apart throughout the whole interior length of the tube. The total area of the holes should equal that of a cross-section of the tube. When a truck or locomotive comes up to the proper position on the track a pipe can be connected to the tube B at D and the tank A be charged with steam for the trip. The pipe L, issuing from the steam-drum of the tank A, is connected, in any of the ordinary well-known ways, to a locomotive-engine attached to and connected in its turn, by crank or gearing, to the driving wheel or wheels of the car or truck on which the whole apparatus is placed and secured.

The manner in which my invention operates is as follows: When the locomotive truck or car, as above described, is to be made ready to start on the first trip the tank is once for all filled about half full with water or other suitable liquid. It is then brought to the pipe coming from the stationary boiler and a connection made with it through the coupling D. The throttle-valve C being then opened, the steam from the stationary boiler rushes into the tank, and the charge of steam for the trip is stored in the tank. When the sound caused by the rush of steam begins to grow faint the charge is stored, or the pressure of steam necessary to make a trip can easily be ascertained by means of an ordinary pressure-gage connected with the tank A. The tank being charged, the throttle-valve C is closed. The steam left in the connecting-pipe between the valves is escaped by any ordinary blow-off cock. The flange-coupling D can then be safely unscrewed, and the car is then free and ready for the trip. When the car returns it is connected again in the same manner as above described, and as much steam is allowed to go into the tank as was expended during the trip. The whole operation of charging the tank requires but a few minutes of time.

What I claim, and desire to secure by Letters Patent, is—

1. The process of furnishing a supply of steam to the water in a reservoir attached to a traveling-engine, for the supply of steam thereto, by temporary connection of the reservoir with the steam-space of a stationary boiler, substantially as set forth.

2. The combination of the perforated tube B with the reservoir A, as and for the purpose set forth and specified.

EMILE LAMM.

Witnesses:

A. B. STOUGHTON,
EDMUND MASSON.